US00RE41412E

(19) United States
(12) Reissued Patent
Van Steenburg

(10) Patent Number: US RE41,412 E
(45) Date of Reissued Patent: Jul. 6, 2010

(54) LEG HOLDER SYSTEM FOR SIMULTANEOUS POSITIONING IN THE ABDUCTION AND LITHOTOMY DIMENSIONS

(75) Inventor: Kip Van Steenburg, Winterpark, FL (US)

(73) Assignee: Allen Medical Systems, Inc., Batesville, IN (US)

(21) Appl. No.: 09/660,433

(22) Filed: Sep. 7, 2000

Related U.S. Patent Documents

Reissue of:
(64) Patent No.: 5,802,641
Issued: Sep. 8, 1998
Appl. No.: 08/813,708
Filed: Mar. 7, 1997

(51) Int. Cl.
*A61G 13/12* (2006.01)

(52) U.S. Cl. ..... 5/648; 5/649; 5/602; 5/624
(58) Field of Classification Search ..... 5/602, 5/648–651, 624
See application file for complete search history.

(56) References Cited

U.S. PATENT DOCUMENTS

| | | | | |
|---|---|---|---|---|
| 542,390 | A | | 7/1895 | Linn |
| 3,982,742 | A | | 9/1976 | Ford |
| 4,180,254 | A | | 12/1979 | Lee et al. |
| 4,185,813 | A | | 1/1980 | Spann |
| 4,252,306 | A | | 2/1981 | Johnson et al. |
| 4,367,869 | A | | 1/1983 | Dailey et al. |
| 4,373,709 | A | | 2/1983 | Whitt |
| 4,407,277 | A | | 10/1983 | Ellison |
| 4,418,900 | A | | 12/1983 | Ricke |
| 4,426,071 | A | * | 1/1984 | Klevstad ..... 5/602 |
| 4,428,571 | A | | 1/1984 | Sugarman |
| 4,443,005 | A | | 4/1984 | Sugarman et al. |
| 4,471,952 | A | | 9/1984 | Spann |
| 4,482,138 | A | | 11/1984 | Spann |
| 4,526,355 | A | | 7/1985 | Moore et al. |
| 4,545,573 | A | | 10/1985 | Murphy |
| 4,579,324 | A | | 4/1986 | McConnell |
| 4,620,698 | A | | 11/1986 | Reed et al. |
| 4,681,309 | A | | 7/1987 | Lechner |
| 4,702,465 | A | | 10/1987 | McConnell |
| 4,732,145 | A | | 3/1988 | Latham |
| 4,766,892 | A | | 8/1988 | Kreitman |
| 4,782,827 | A | | 11/1988 | Paratte |
| 4,802,464 | A | | 2/1989 | Deprez |
| 4,809,687 | A | | 3/1989 | Allen |

(Continued)

OTHER PUBLICATIONS

"O.R. Direct Surgical Table Accessories", Aug. 1996, (9 pages).
Advertisement of Allen Medical Systems. "Just Lift It", (4 pages), Parent U.S. Appl. No. 08/813,708, Patent No. 5,802,6141.
Brouchure of O.R. Direct Surgical Table Accessories (Aug. 1996).

*Primary Examiner*—Michael Trettel
(74) *Attorney, Agent, or Firm*—Barnes & Thornburg LLP

(57) ABSTRACT

A leg holder system for simultaneously positioning in the abduction and lithotomy dimensions including a support device for supporting a leg cradle; a clamping device for mounting the proximate end of the support device to a mounting device having a first axis and selectively clamping and releasing motion of the support device about the first axis and about a second axis transverse to the first axis. An actuator device for actuating the clamp to selectively clamp and release simultaneously the support device and the mounting device; and an operator device remote from the clamping device and actuator device for operating the actuator device to enable the support device to move simultaneously about the first and second axis in both the lithotomy and abduction dimensions.

52 Claims, 6 Drawing Sheets

U.S. PATENT DOCUMENTS 4,827,496 A 5/1989 Cheney
4,886,258 A 12/1989 Scott
4,913,413 A 4/1990 Raab
4,940,218 A * 7/1990 Akcelrod ..... 5/621
5,001,739 A 3/1991 Fischer
5,027,799 A 7/1991 Laico et al.
5,042,508 A 8/1991 Richard
5,056,535 A 10/1991 Bonnell
5,097,847 A 3/1992 Mikhail et al.
5,290,220 A 3/1994 Guhl
5,462,551 A 10/1995 Bailey et al.
5,514,143 A 5/1996 Bonutti et al.
5,515,562 A 5/1996 Miller et al.
5,560,577 A * 10/1996 Keselman ..... 248/229.25
5,582,379 A * 12/1996 Keselman et al. ..... 248/229.25
5,608,934 A 3/1997 Torrie et al.
5,645,079 A 7/1997 Zahiri et al.
5,738,675 A 4/1998 Botimer
5,799,349 A 9/1998 Petersen
5,806,117 A 9/1998 Gotfried
5,918,330 A * 7/1999 Navarro et al. ..... 5/624
6,058,534 A * 5/2000 Navarro et al. ..... 5/624
6,108,841 A * 8/2000 Cameron et al. ..... 5/624
6,289,537 B1 * 9/2001 Hopper et al. ..... 5/602

* cited by examiner

LEG HOLDER SYSTEM FOR SIMULTANEOUS POSITIONING IN THE ABDUCTION AND LITHOTOMY DIMENSIONS

Matter enclosed in heavy brackets [ ] appears in the original patent but forms no part of this reissue specification; matter printed in italics indicates the additions made by reissue.

*This application is a Reissue of U.S. patent application Ser. No. 08/813,708, filed on Mar. 7, 1997 and now U.S. Pat. No. 5,802,641.*

FIELD OF INVENTION

This invention relates to an improved leg holder system and more particularly to such a system in which adjustment in both the lithotomy and abduction dimensions can be made simultaneously with a single action.

BACKGROUND OF INVENTION

In recent years many newer surgical procedures have required interoperative positioning of patients legs. Until recently such positioning typically required adjusting the leg holder's mounting clamp located on the surgical table siderail, beneath the sterile drape. This raised concerns about possible violation of the sterile field and it limited the performance of such adjustments to non-sterile personnel. Recent attempts to solve this problem yielded leg holders that could be raised and lowered through the drapes, however, they have several limitations. First, when adjusted upwardly they lock by means of a ratchet mechanism; this mechanism does not prevent further unintended upward movement of the legs that could result from tilting the patient in the extreme head down direction "Trendelenburg" or from surgical staff leaning against the leg holder. Secondly, abduction is predetermined and cannot be adjusted without accessing the mounting clamp.

SUMMARY OF INVENTION

It is therefore an object of this invention to provide an improved leg holder system.

It is a further object of this invention to provide such a system with which both the lithotomy and abductions for a leg holder can be adjusted with a single action with one hand.

It is a further object of this invention to provide such a system which permits adjustment without violating the sterile field.

It is a further object of this invention to provide such a system which prevents further inadvertent upward movement even when the patient is tilted in the extreme head down or Trendelenburg direction.

It is a further object of this invention to provide such a system which when locked prevents movement in all directions.

It is a further object of this invention to provide such a system which permits a full abduction adjustment range throughout the full lithotomy range.

It is a further object of this invention to provide such a system which the clamps are normally locked and must be activated for release.

It is a further object of this invention to provide such a system which release of the actuation of the clamps causes them to default to the locked condition.

It is a further object of this invention to provide such a system in which the clamps are remotely operable.

It is a further object of this invention to provide such a system in which the clamping operation is accomplished through the same instrumentality as the re-positioning of the leg holders.

It is a further object of this invention to provide such a system in which the leg holders are counterbalanced for reducing the load encountered by the user with a patient in place.

It is a further object of this invention to provide such a system in which the operation of the clamping means can be accomplished with the same action as the repositioning of the leg holders or can be decoupled for independent operation.

This invention results from the realization that a truly simple, fail-safe leg holder system which enables simultaneous positioning in the abduction and lithotomy dimensions with a single action outside the sterile field can be effected using an actuator that is normally biased to clamp both the leg cradle support device and a mounting device which have a mutually transverse axes and under control of a remote operator simultaneously releases the clamping force in both devices to enable movement of the support device about both axes for repositioning in both the abduction and lithotomy dimensions.

This invention features a leg holder system for simultaneous positioning in the abduction and lithotomy dimensions. There is a support device for supporting a leg cradle and a clamping device for mounting the proximate end of the support device to a mounting device having a first axis and selectively clamping and releasing motion of the support device about the first axis and about a second axis transverse to the first axis. An actuator device actuates the clamp to selectively clamp and release simultaneously the support device and the mounting device. An operator device remote from the clamping device and actuator device operates the actuator device to enable the support device to move simultaneously about both the first and second axes in the abduction and lithotomy dimensions.

In a preferred embodiment the clamping device may include a pair of pressure blocks a first recess for receiving the mounting device and a second recess for receiving a support device. The clamping device may include a device for biasing the blocks to normally produce friction between the recesses and their respective mounting and support devices to clamp them in position. The actuator device may include an actuator rod extending with a support device. The support device may include a bore and the actuator rod may be disposed in the bore. The actuator device may include a camming device fixed to the actuator rod and a follower device disposed in the clamping device and responsive to the camming device for opposing the biasing device to simultaneously decrease the friction force on the support device and on the mounting device to release the clamping device in both axes. The operator device may include a handle for both operating the actuator device to remotely release and secure the clamping device to the support device and the mounting device and to position the support device in the abduction and lithotomy dimensions. The support device may include a resilient device for counterbalancing the weight of the leg holder. The axis of the handle may be coincident with the axis with the actuator rod for independent actuation of the clamping device and motion of the support device in the lithotomy and abduction dimensions. The handle may include a rotatable sleeve. The support device may include a leg cradle bracket for mounting a leg cradle spaced from the axis of the support means. The actuator device may include a limiter device for arresting movement of the camming device before its highest position to enable the biasing device to back-drive the camming device when the operator device is released and automatically reestablish the clamping function between the recesses and the support and mounting devices.

DISCLOSURE OF PREFERRED EMBODIMENT

Other objects, features and advantages will occur to those skilled in the art from the following description of a preferred embodiment and the accompanying drawings, in which.

Figure 1:
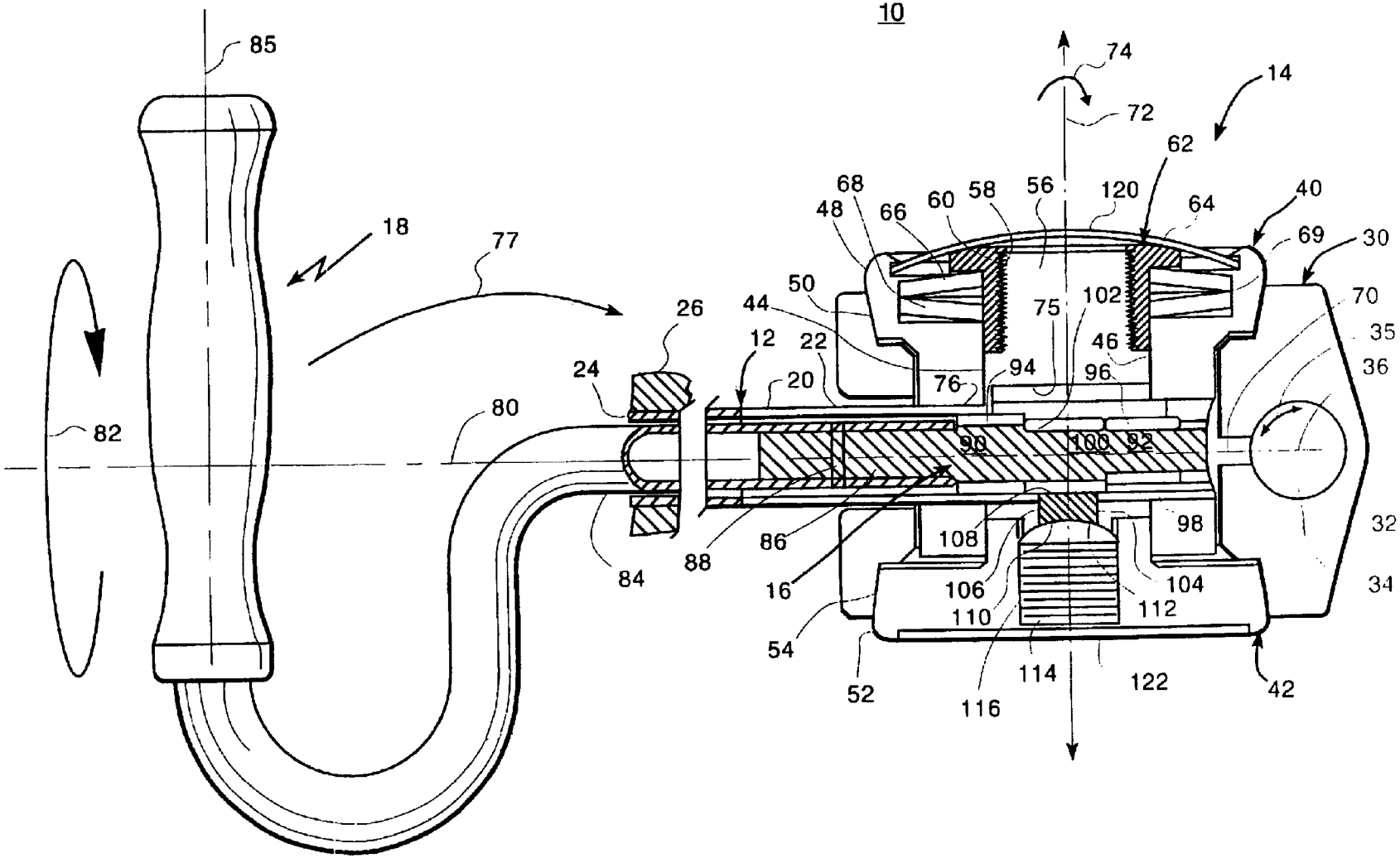
FIG. 1 is a detailed sectional view of a leg holder system with portions broken away and foreshortened of a leg holder system according to this invention.
Figure 3:
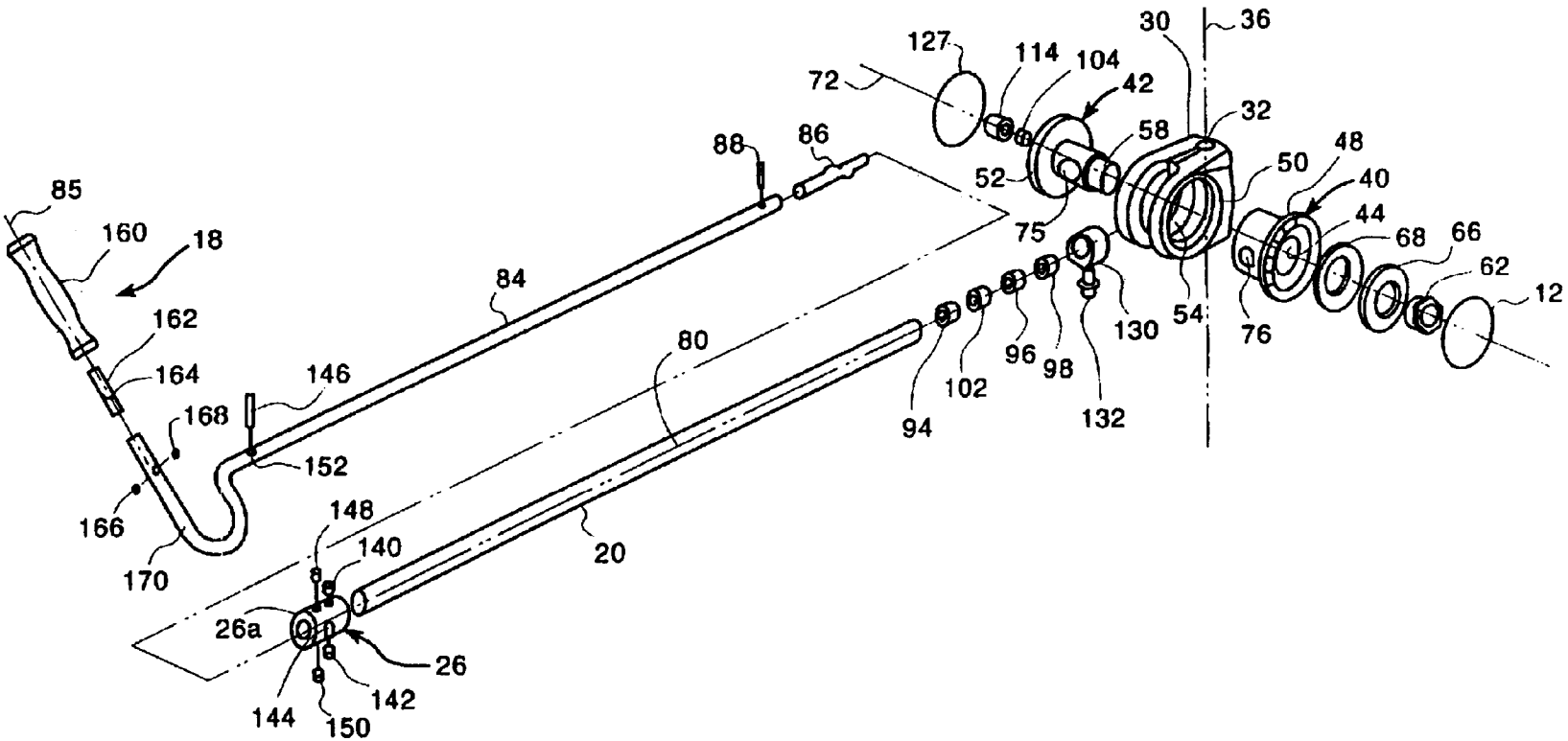
FIG. 3 is an exploded view of the leg holder system shown in FIGS. 1 and 2.

There is shown in FIG. 1, leg holder system 10 according to this invention which enables simultaneous positioning in the abduction and lithotomy dimensions. Leg holder system 10 includes support device 12 for supporting a leg cradle not shown in FIG. 1, but seen in FIGS. 4, 5, and 6. System 10 also includes a clamping device 14, actuator device 16, and an operator device, handle 18. Support device 12 includes a hollow tube 20 which has its proximal end 22 located in clamping device 14 and its distal end 24 at handle 18. Limiter device 26 shown more completely in FIG. 3, is mounted at the distal end 24 of hollow tube 20. Clamping device 14 includes a clamp housing 30 having a recess 32 which receives and clamps a mounting device such as pivot post 34 extending from an x-ray table. Clamp housing 30 is rotatable about axis 36 of pivot post 34 which allows motion in the abduction dimension indicated by arrow 35.

Clamp housing 30 also includes a bore 38 which receives pressure blocks 40 and 42. Pressure block 40 has a bore 44 through it which receives the body 46 of pressure block 42. The enlarged tapered head 48 of pressure block 40 fits in the enlarged tapered bore 50 of clamp housing 30. Enlarged tapered head 52 of pressure block 42 fits in an enlarged tapered bore 54 of clamp housing 30. The distal end 56 of pressure block 42 includes threads 58 which mate with threads 60 on locking nut 62. The enlarged head 64 of locking nut 62 engages one of two oppositely facing Belleville washers 66 and 68 located in recess 69. Thus, when locking nut 62 is tightened down on pressure block 42 it compresses the Belleville washers 66 and 68. This causes the tapered portions 48 and 52 of pressure blocks 40 and 42 the force of the Belleville washers to be drawn tightly inwardly against the tapered recesses 50 and 54 of clamp housing 30. This wedging effect insures a good tight clamping force which brings clamp housing together by narrowing gap 70 and thereby tightening recess 32 about pivot post 34 and simultaneously wedging pressure blocks 42 and 40 tightly in the tapered recesses 50 and 54, respectively, so that they are held against rotation in the lithotomy dimension about their central axis 72 as shown by arrow 74.

Thus, in the normal condition locking nut 62 is tightened down sufficiently to compress Belleville washers 66 and 68 so that a clamping force is applied to prevent rotation 74 about axis 72 in the lithotomy dimension and prevent rotation 35 about axis 36 in the abduction dimension. Release of both of these clamping forces in both dimensions is accomplished simultaneously by rotating handle 18 about axis 80 as indicated by arrow 82. This rotation causes actuator rod 84 to rotate along with actuator member 86 which is fixed by pin 88 to rotate with rod 84. Pressure block 42 includes a bore 75 which is larger than but coaxially aligned with a similar bore 76 in pressure block 40. The proximal end 22 of tube 20 of support device 12 passes through bores 75 and 76 and is fixed or force fitted to bore 76 so that when handle 18 and tube 20 of support device 12 are rotated up out of the paper as indicated by arrow 77 the entire pressure block assembly including pressure blocks 40 and 42 is rotated with tube 20.

Actuator member 16 includes two bearing portions 90 and 92 which receive needle bearings 94 and 96 that enable rod 84 to rotate smoothly within tube 20. Bearing 96 is supported in journal 98 fitted in the end of tube 20. Between bearing portions 90 and 92 is eccentric portion 100 which also supports a needle bearing 102. Riding on needle bearing 102 is follower 104 which extends through bore 106 in the proximal end 22 of tubing 20. The end 108 of follower 104 is cylindrically shaped to engage the cylindrical shape of needle bearing 102. The other end 110 is concave or cup shaped to engage the spherical tip 112 of set screw 114 which is threadibly engaged in bore 116 of pressure block 42. Thus, when handle 82 is rotated about axis 80 it rotates the eccentric portion 100 to bear on follower 104 which in turn exerts an outward force on set screw 116. As a result there is a force directed along axis 72 which opposes the bias of Belleville washers 66 and 68 thereby releases the force of pressure blocks 40 and 42 on tapered portions 50 and 54 of clamp housing 30. This allows clamp housing 30 to spread somewhat thereby increasing the length of gap 70 so that recess 32 relaxes its grip on pivot post 34 and permits rotation as indicated by arrow 35 in the abduction direction and simultaneously permits pressure blocks 40 and 42 to rotate in the tapered recesses 50 and 54 so that actuator rod 84 and tube 20 of support device 12 can be rotated in a direction out of or into the paper as indicated by arrow 77.

Thus with one action, the rotation of handle 18 about axis 80, the clamp releases its grip to allow rotation about both axis 36 and axis 72 to provide simultaneous repositioning in the abduction and lithotomy dimensions. When the handle is released the force of Belleville washers 66 and 68 back-rotate the eccentric, snapping the handle to the normal position and allowing the Belleville washer to reinstate the clamping force on both axes. Covers 120 and 122 may be installed to cover the heads of pressure blocks 40 and 42, respectively.

Figure 2:
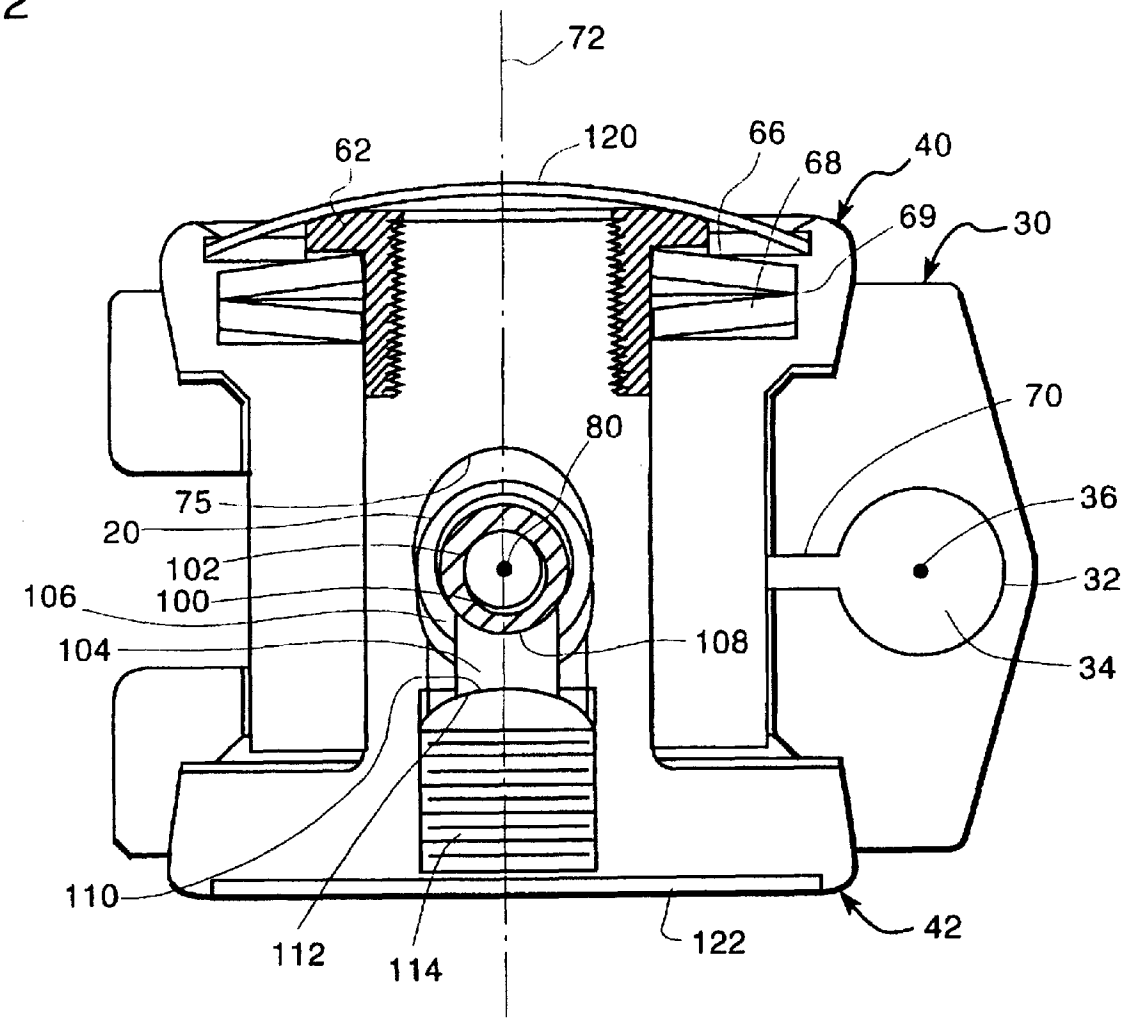
FIG. 2 is a view similar to FIG. 1, with the support device rotated 90°.

The rotation of support device 12 in the direction of arrow 77, FIG. 1, is shown in FIG. 2, where upon the rotation of handle 18 about axis 80 and the application of eccentric 100 to counteract the clamping force of Belleville washers 66 and 68, the entire support device 12 including tube 20 and the actuator rod 84 have been rotated from the plane of the paper in FIG. 1, to the upright position where tube 20 and actuator rod 84 are perpendicular to the plane of the paper in FIG. 2.

The rotational symmetry as well as rotational action may be better understood with reference to the exploded three dimensional view in FIG. 3. Also shown in FIG. 3 is collar 130 which is held to the end of tube 20 by means of set screw 132 and the limiter collar 26a on the other end of tube 20 which is held there by means of set screws 140 and 142. A circumferential slot 144 which extends less than all the way around the circumference of limiter collar 26a receives limiter pin 146 fixed to rotate with actuator rod 84. A pair of bushings 148 and 150 are mounted on either end of limiter pin 146 after it is mounted in hole 152 of actuator rod 84 to provide for a smoother rotation within slot 144. It is limiter pin 146 in conjunction with the limited extent of slot 144 that arrests the rotation of actuator rod 84 before it reaches top dead center on the cam so that upon release by the human operator of handle 18 the handle and actuator rod 84 snap back to the position where they do not oppose the force of Belleville washer 66 and 68 and so the Belleville washers reinstate the fail-safe clamping force on both axes. Handle 18 is rotatably mounted on pin 160 which is mounted for rotation about axis 85 on pin 162. Pin 62 includes a groove 164 that allows it and handle 160 to rotate about axis 85 but which engages with spring loaded balls 166 and 168 that prevent the handle 160 and pin 162 from being withdrawn from the hollow end 170 of actuator rod 84.

Although thus far the system can be shown as actuated by mechanical device namely, the action of eccentric 100. This is not a necessary limitation of the invention, for example, any device may be substituted for eccentric 100 which will exert the opposing force on follower 104 or a similar device to release the action of Belleville washers 66 and 68 on the pressure blocks and clamp pressure blocks 40 and 42 and clamp housing 30. For example, a hydraulic piston could be installed in place of eccentric 100 driven through hydraulic lines by a foot pedal, for example, which would be remote from the device and external to the sterile drapes. Similarly an electrical device having a movable armature could be used in the same fashion or even a piezo electric crystal or similar device when only small mechanical movements are required.

Figure 4:
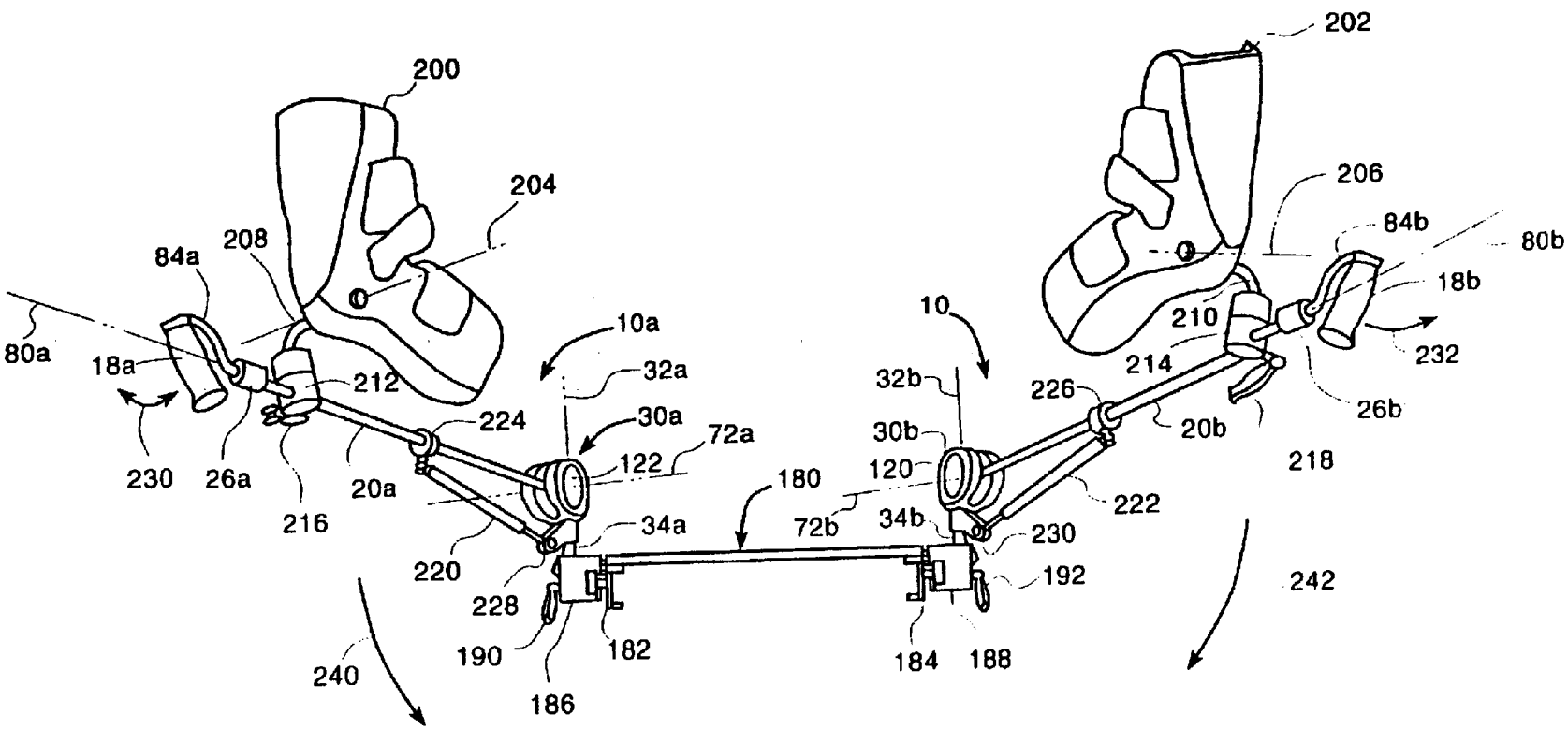
FIG. 4 is a pair of leg holder systems according to this invention as shown in FIGS. 1, 2 and 3 installed on an x-ray table with leg cradles and leg cradle clamps installed and employing gas cylinder lift assistance devices.

Typically, in use, two such systems 10a and 10b are used in conjunction with an x-ray table 180, FIG. 4. X-ray table 180 includes two rails 182 and 184 on which slide blocks 186 can be slid into and out of the plane of the paper and tightened at a desired location by handles 190 and 192. Pivot posts 34a and 34b extend upward from clamps 186 and 188 into recesses 32a and 32b, not shown, of clamp housings 30a and 30b. Mounted on each support device 20a and 20b are leg cradles (leg holders) 200 and 202 pivotally mounted on axes 204 and 206 which are spaced from the axes 80a and 80b of tubes 20a and 20b by support shafts 208 and 210 which are supported in clamps 212 and 214 that are clamped into position on tubes 20a and 20b by handles 216 and 218. The lifting of the weight of this system including cradles 200 and 202 and the legs of the patient may be assisted by means of springs or gas cylinders or other devices as symbolically indicated by gas cylinders 220 and 222 mounted to support tubes 20a and 20b by clamps 224 and 226 and mounted to pivot posts 34a and 34b by clamps 228 and 230.

Figure 5:
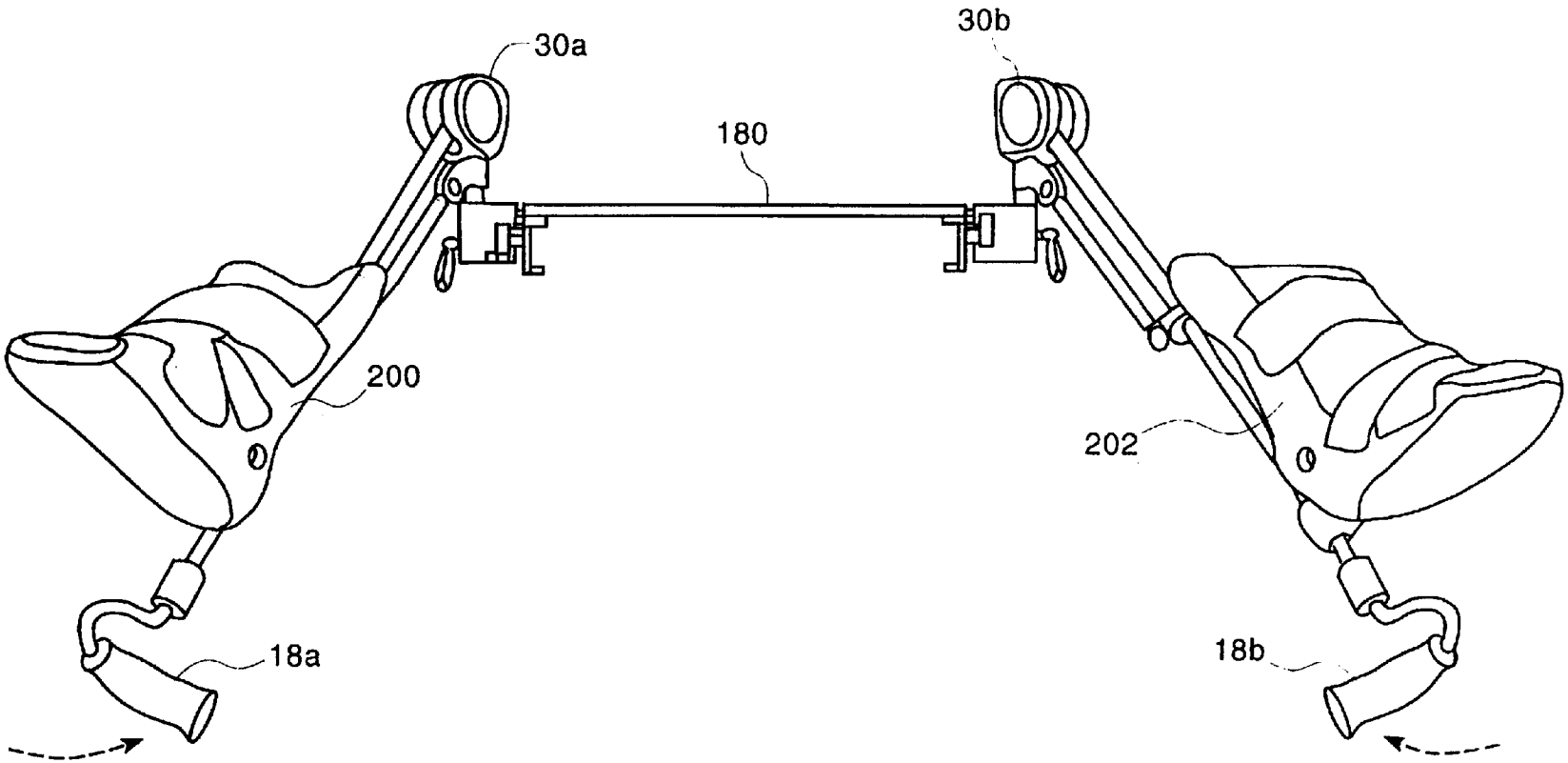
FIG. 5 is a view similar to FIG. 4 with the leg cradles repositioned with greater abduction and lesser lithotomy.
Figure 6:
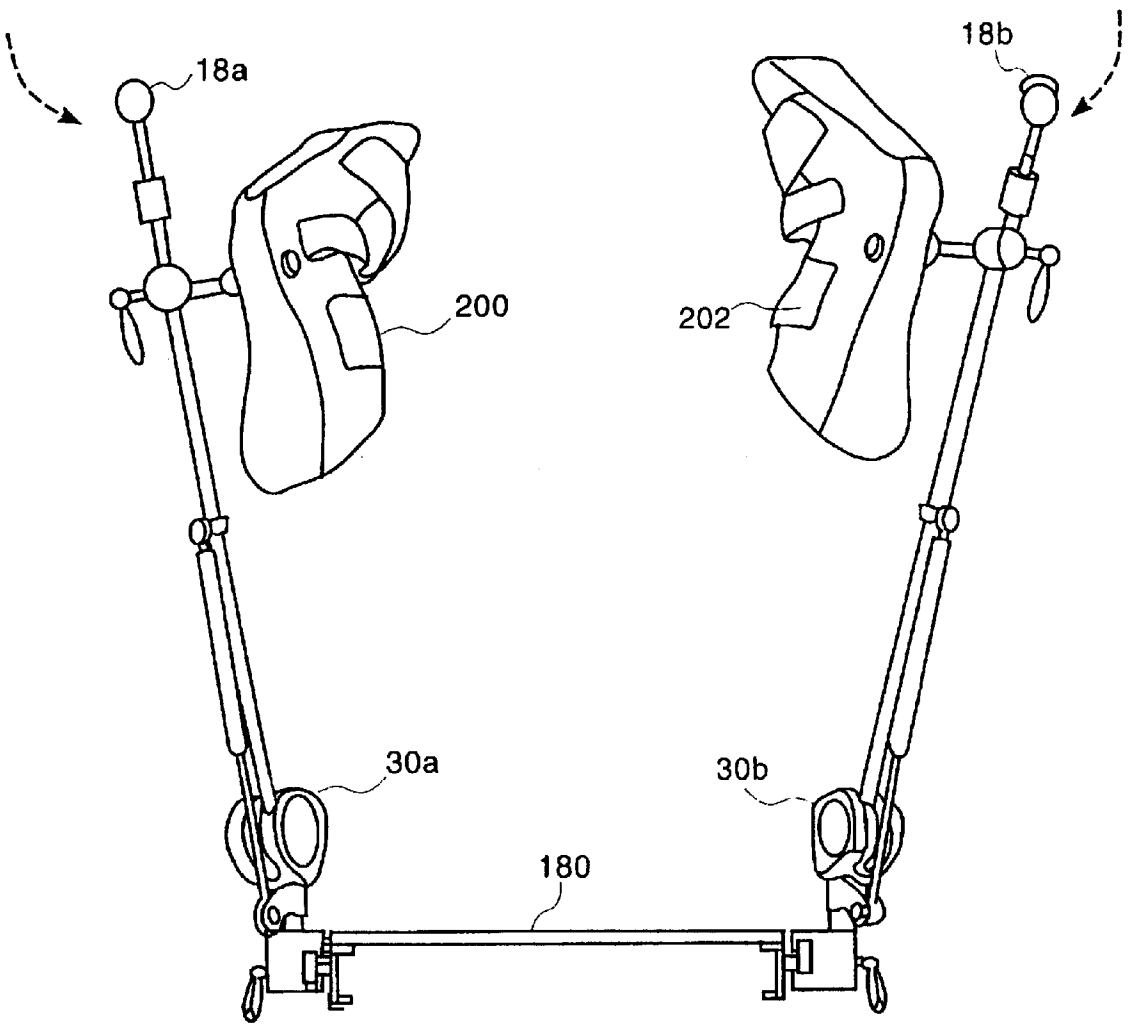
FIG. 6 is a view similar to FIG. 4 with the leg cradles repositioned with greater lithotomy and lesser abduction.

In FIG. 4, cradles 200 and 202 are in a midrange position with respect to the lithotomy and abduction dimensions. By simply gripping handles 18a and 18b and rotating them in the direction of arrows 230 and 232 the eccentric members are engaged opposing the Belleville washer force and freeing up and releasing the clamping action on both axes 32a and 32b and axes 72a and 72b. Now by simply moving the handles downwardly as indicated by arrows 240 and 242 the cradles 200 and 202, FIG. 5, can be moved to a lower position in the lithotomy dimension and may be spread farther apart in the abduction dimension as shown in FIG. 5, or alternatively the same motion of handles 18a and 18b in FIG. 4, which releases the clamp in both dimensions. After the operation of both of them which releases them in both dimensions the handles 18a and 18b can be moved upwardly to increase the position in the lithotomy dimension and reduce somewhat the position in the abduction dimension as shown in FIG. 6. In each case upon the accidental or intentional release of the handles 18a and 18b the limiter device allows the Belleville washers to snap the handles and the actuator rods and the eccentric out of position so that the Belleville washers, once more in a fail-safe mode, apply the clamping force in both dimensions.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A leg holder system for simultaneous positioning in an abduction dimension and a lithotomy dimension comprising:

a support device, having a longitudinal axis, for supporting a leg cradle;

a clamping device for mounting a proximate end of said support device to a mounting device having a first axis transverse to said longitudinal axis and selectively simultaneously clamping and releasing motion of said support device about said first axis and about a second axis transverse to both said first axis and said longitudinal axis, said support device fixed in said clamping device from rotation about said longitudinal axis;

an actuator device for actuating said clamping device to simultaneously selectively clamp and release said support device and said mounting device; and an operator device remote from said clamping device and said actuator device for operating said actuator device to enable said support device to move jointly about both said first and said second axes in the abduction and lithotomy dimensions.

2. The leg holder system of claim 1 in which said clamping device includes a pair of pressure blocks, a first recess for receiving said mounting device and a second recess for receiving said support device.

3. The leg holder system of claim 2 in which said clamping device includes a biasing device for biasing said blocks to normally produce friction between said recesses and their respective mounting and support devices to clamp them in position.

4. The leg holder system of claim 1 in which said actuator device includes an actuator rod extending with said support device.

5. The leg holder system of claim 4 in which said support device includes a bore and said actuator rod is disposed in said bore.

6. The leg holder system of claim 4 in which said actuator device includes a camming device fixed to said actuator rod and a follower device disposed in said clamping device and responsive to said camming device for opposing said biasing device to simultaneously decrease the friction force on said support device and on said mounting device to release the clamping device in both axes.

7. The leg holder system of claim 1 in which said operator device includes a handle for both operating said actuator device to remotely release and secure said clamping device to said support device and said mounting device and to position said support device in the abduction and lithotomy dimensions.

8. The leg holder system of claim 1 in which said support device includes a resilient device for counterbalancing the weight borne by said support device.

9. The leg holder system of claim 6 in which said operator device includes a handle for both operating said actuator device to remotely release and secure said clamping device to said support device and said mounting device and to position said support device in the abduction and lithotomy dimensions.

10. The leg holder system of claim 9 in which the axis of said handle is coincident with the axis of said actuator rod for independent actuation of said clamp device and motion of said support device in the lithotomy dimension.

11. The leg holder system of claim 7 in which said handle includes a rotatable sleeve.

12. The leg holder system of claim 1 in which said support device includes a cradle bracket for mounting a leg cradle spaced from said longitudinal axis of said support means.

13. The leg holder system of claim 6 in which said actuator device includes a limiter device for arresting movement of said camming device before its highest position to enable said biasing device to back-drive said camming device when said operator device is released and automatically re-establish the clamping friction between said recesses and said support and mounting devices.

*14. A leg positioning apparatus comprising*

*a mounting device configured to be attached to a surgical table,*

*a support device having a longitudinal axis, the support device being hollow,*

*a clamping device for mounting a proximate end of the support device to the mounting device having a first axis transverse to said longitudinal axis, the clamping device being configured to selectively simultaneously clamp the motion of the support device about the first axis and about a second axis transverse to both the first axis and the longitudinal axis and to selectively simultaneously release the motion of the support device for movement about said first and second axes, said support device being fixed in said clamping device from rotation about said longitudinal axis,*

*wherein the clamping device includes a plurality of clamping elements, at least one first clamping element of the plurality of clamping elements is movable between a first clamping position to prevent the motion of the support device about the first axis and a first releasing position to release motion of the support device about the first axis, at least one second clamping element of the plurality of clamping elements being movable between a second clamping position to prevent the motion of the support device about the second axis and a second releasing position to release motion of the support device about the second axis,*

*wherein the simultaneous motion of the support device about the first and second axes is permitted after the at least one first clamping device element is moved to the first releasing position and after the at least one second clamping device element is moved to the second releasing position,*

*wherein the simultaneous motion of the support device about the first and second axes is prevented after the at least one first clamping device element is moved to the first clamping position and after the second clamping device element is moved to the second clamping position,*

*at least one actuator device configured to move the at least one first clamping device element and the at least one second clamping device element to the respective first and second releasing positions, at least a portion of the at least one actuator device extending within the support device,*

*an operator device situated adjacent a distal end of the support device, the handle being movable to actuate the at least one actuator device to move the first and second clamping device elements between the respective first and second releasing positions and the respective first and second clamping positions, and*

*a leg cradle supported by the support device between the operator device and the clamping device and movable about a plurality of leg cradle axes relative to the support device, wherein the leg cradle is movable about the first plurality of axes when the support device is clamped against movement about the first and second axes.*

*15. The leg positioning apparatus of claim 14, wherein the first axis about which the support device rotates corresponds to an abduction dimension and the second axis about which the support device rotates corresponds to a lithotomy dimension.*

*16. The leg positioning apparatus of claim 14, wherein the support device comprises an elongated tube.*

*17. The leg positioning apparatus of claim 16, wherein the operator device comprises a handle positioned adjacent the distal end of the elongated tube.*

*18. The leg positioning apparatus of claim 17, wherein the longitudinal axis of the support device passes through the handle.*

*19. The leg positioning apparatus of claim 16, wherein the portion of the actuator extending within the support device comprises a rod extending with the elongated tube.*

*20. The leg positioning apparatus of claim 19, wherein the rod is rotatable within the elongated tube to move at least one of the first and second clamping device elements to the unclamping position.*

*21. The leg positioning apparatus of claim 14, wherein one of the first and second clamping device elements comprises a housing formed to include a tapered bore and the other of the first and second clamping device elements comprises a pressure block configured to wedge against the tapered bore.*

*22. The leg positioning apparatus of claim 21, wherein the housing includes a recess configured to receive the mounting device and the pressure block being biased to tighten the recess of the housing against the mounting device.*

*23. The leg positioning apparatus of claim 22, wherein the clamping device includes at least one Belleville washer to bias the pressure block to wedge against the tapered bore.*

*24. A leg positioning apparatus comprising*

*a mounting device configured to attach to a surgical table,*

*a support device comprising an elongated member having a longitudinal axis,*

*a leg holder pivotably coupled to the support device and adapted to engage and support at least a portion of a leg of a patient,*

*a coupler configured to couple the leg holder to the elongated member, the coupler being configured to permit adjustment of a position of the leg holder relative to the elongated member about at least one leg holder axis,*

*a clamping device for mounting a proximate end of the elongated member to the mounting device having a first axis transverse to said longitudinal axis, the clamping device being configured to selectively simultaneously clamp the motion of the elongated member about the first axis and about a second axis transverse to both the first axis and the longitudinal axis and to selectively simultaneously release the motion of the elongated member for movement about said first and second axes, said elongated member being fixed in said clamping device from rotation about said longitudinal axis,*

*wherein the clamping device includes a plurality of clamping elements, at least one first clamping element of the plurality of clamping elements is movable between a first clamping position to prevent the motion of the elongated member about the first axis and a first releasing position to release motion of the elongated member about the first axis, at least one second clamping element of the plurality of clamping elements being movable between a second clamping position to prevent the motion of the elongated member about the second axis and a second releasing position to release motion of the elongated member about the second axis,*

*wherein the simultaneous motion of the elongated member about the first and second axes is permitted after the at least one first clamping device element is moved to the first releasing position and after the at least one second clamping device element is moved to the second releasing position,*

*wherein the simultaneous motion of the elongated member about the first and second axes is prevented after the at least one first clamping device element is moved to the first clamping position and after the second clamping device element is moved to the second clamping position, and*

*an operator device comprising a handle coupled to the elongated member and operatively coupled to the clamping device, the coupler being positioned between the handle and the clamping device, the elongated member extending away from the clamping device beyond the coupler and the leg holder to a distal end, the handle being situated beyond the distal end of the elongated member and movable to move the first and second clamping device elements between the respective first and second clamping positions and the respective first and second releasing positions, and the handle being usable to reposition the elongated member about the first and second axes after the first and second clamping device elements are moved to the respective first and second releasing positions.*

*25. The leg positioning apparatus of claim 24, wherein the mounting device includes a post that defines the first axis.*

*26. The leg positioning apparatus of claim 25, wherein at least one of the first and second clamping device elements clamps against the post when the first and second clamping device elements are in the respective first and second clamping positions.*

*27. The leg positioning apparatus of claim 25, wherein the mounting device includes a block adapted to be coupled to an accessory rail of a patient-support table and the post is coupled to the block.*

*28. The leg positioning apparatus of claim 25, further comprising a resilient device configured to counterbalance weight supported by the leg holder, the resilient device being coupled to the mounting device, and the resilient device being coupled to the elongated member.*

*29. The leg positioning apparatus of claim 24, wherein the coupler is configured to be loosened for repositioning along the elongated member and tightened to prevent repositioning along the elongated member.*

*30. The leg positioning apparatus of claim 29, wherein the coupler is rotatable about the elongated member when loosened.*

*31. The leg positioning apparatus of claim 24, wherein the operator device is rotatable about the longitudinal axis of the elongated member to move at least one of the first and second clamping device elements between the respective first and second clamping position and the respective first and second releasing position.*

*32. The leg positioning apparatus of claim 24, further comprising a rod coupled to the operator device and extending therefrom toward the clamping device.*

*33. The leg positioning apparatus of claim 32, wherein the elongated member comprises a tube having a passage therethrough and at least a portion of the rod is positioned in the passage.*

*34. The leg positioning apparatus of claim 32, wherein a portion of the tube and a portion of the rod extend through the coupler.*

*35. The leg positioning apparatus of claim 24, wherein at least one of the first and second clamping device elements is yieldably biased against the mounting device when the first and second clamping device elements are in the respective first and second clamping positions.*

*36. The leg positioning apparatus of claim 24, wherein the mounting device comprises a post and at least one of the first and second clamping device elements comprises a housing formed to include a recess receiving the post and a gap extending therefrom such that increasing the size of the gap permits rotation of the housing relative to the post.*

*37. The leg positioning apparatus of claim 36, wherein the post defines the first axis and the housing is formed to include a bore defining the second axis.*

*38. The leg positioning apparatus of claim 37, wherein the first axis is spaced from the second axis such that the first and second axes do not intersect.*

*39. The leg positioning apparatus of claim 37, wherein at least one of the first and second clamping device elements comprises first and second pressure blocks received by the bore, the first pressure block being movable relative to the second pressure block within the bore, the first and second pressure blocks engaging the housing and being configured so that the movement of the first pressure block toward the second pressure block decreases the length of the gap of the housing and the housing grips the post, thereby blocking rotation of the housing relative to the post.*

*40. The leg positioning apparatus of claim 24, wherein at least one of the first and second clamping device elements includes a housing and the other of the first and second clamping device elements comprises a first pressure block received by the housing, a second pressure block received by the housing, and a spring received by the housing and acting to yieldably bias the first pressure block toward the second pressure block.*

*41. The leg positioning apparatus of claim 40, wherein the first pressure block comprises a proximal end, a distal end, and a head formed on the distal end and the second pressure block comprises a proximal end, a distal end, and a head formed on the distal end, and wherein the first and second pressure blocks are movable between an inward position at which the head of the first pressure block and the head of the second pressure block frictionally engage the housing to block rotation of the first and second pressure blocks relative to the housing and an outward position permitting rotation of the first and second pressure blocks relative to the housing.*

*42. The leg positioning apparatus of claim 41, wherein at least one of the first and second pressure blocks is formed to include a bore receiving the elongated member so that the elongated member rotates relative to the housing when the first and second pressure blocks rotate relative to the housing and so that movement of the elongated member relative to the housing is blocked when the first and second pressure blocks are at the inward position.*

*43. The leg positioning apparatus of claim 41, wherein the mounting device includes a post, the housing is formed to include a recess receiving the post and a gap extending therefrom, the housing being flexible to increase the size of the gap to permit rotation of the housing relative to the post and movement of the first and second pressure blocks to the inward position decreases the gap thereby blocking rotation of the housing relative to the post.*

*44. The leg positioning apparatus of claim 24, wherein the one of the first and second clamping device elements include a housing and the other of the first and second clamping device elements include first and second pressure blocks that are received by the housing and that are movable relative to one another between an inward position at which the first and second clamping device elements are in the respective first and second clamping positions and an outward position at which the first and second clamping device elements are in the respective releasing positions.*

*45. The leg positioning apparatus of claim 44, further comprising an actuator device operatively coupling the operator device to at least one of the first and second pressure blocks, the actuator device being movable between a first position at which the first and second pressure blocks are at the outward position and a second position at which the first and second pressure blocks are at the inward position.*

*46. The leg positioning apparatus of claim 45, further comprising a rod coupled to the handle and coupled to the actuator device so that movement of the handle moves the actuator device.*

*47. The leg positioning apparatus of claim 44, wherein the actuator device includes an eccentric portion, one of the first and second pressure blocks comprises a follower portion, the eccentric portion engaging the follower portion to move the first and second pressure blocks to the outward position when the actuator device is rotated in a first direction.*

*48. A leg positioning apparatus comprising*

*a tube having a longitudinal axis,*

*a mounting device configured to attach to a surgical table,*

*a clamping device for mounting a proximate end of the tube to the mounting device having a first axis transverse to said longitudinal axis, the clamping device being configured to selectively simultaneously clamp the motion of the tube about the first axis and about a second axis transverse to both the first axis and the longitudinal axis and to selectively simultaneously release the motion of the tube for movement about said first and second axes, said tube being fixed in said clamping device from rotation about said longitudinal axis,*

*wherein the clamping device includes a plurality of clamping elements, at least one first clamping element of the plurality of clamping elements is movable between a first clamping position to prevent the motion of the tube about the first axis and a first releasing position to release motion of the tube about the first axis, at least one second clamping element of the plurality of clamping elements being movable between a second clamping position to prevent the motion of the tube about the second axis and a second releasing position to release motion of the tube about the second axis,*

*wherein the simultaneous motion of the tube about the first and second axes is permitted after the at least one first clamping device element is moved to the first releasing position and after the at least one second clamping device element is moved to the second releasing position,*

*wherein the simultaneous motion of the tube about the first and second axes is prevented after the at least one first clamping device element is moved to the first clamping position and after the second clamping device element is moved to the second clamping position, and*

*a leg holder coupled to the tube at a first distance away from the clamping device, and*

*an operator device coupled to the tube at a second distance away from the clamping device, the second distance being greater than the first distance, the tube extending away from the clamping device beyond the leg holder to a distal end of the tube, the operator device being coupled to the tube near the distal end of the tube beyond the leg holder, the operator device being movable to move the first and second clamping device elements between the respective first and second clamping positions and the respective first and second releasing positions.*

*49. A leg positioning apparatus comprising*

*a mounting device configured to attach to a surgical table,*

*a support device lockable relative to the mounting device and releasable to rotate relative to the mounting device about a first plurality of axes, the support device being tubular and having a longitudinal axis,*

*a clamping device for mounting a proximate end of the support device to a mounting device having a first axis of the first plurality of axes transverse to said longitudinal axis, the clamping device being configured to selectively simultaneously clamp the motion of the support device about the first axis and about a second axis of the first plurality of axes transverse to both the first axis and the longitudinal axis and to selectively simultaneously release the motion of the support device for movement about said first and second axes, said support device being fixed in said clamping device from rotation about said longitudinal axis,*

*wherein the clamping device includes a plurality of clamping elements, at least one first clamping element of the plurality of clamping elements is movable between a first clamping position to prevent the motion of the support device about the first axis and a first releasing position to release motion of the support device about the first axis, at least one second clamping element of the plurality of clamping elements being movable between a second clamping position to prevent the motion of the support device about the second axis and a second releasing position to release motion of the support device about the second axis,*

*wherein the simultaneous motion of the support device about the first and second axes is permitted after the at least one first clamping device element is moved to the first releasing position and after the at least one second clamping device element is moved to the second releasing position,*

*wherein the simultaneous motion of the support device about the first and second axes is prevented after the at least one first clamping device element is moved to the*

*first clamping position and after the second clamping device element is moved to the second clamping position,*

*a leg holder lockable relative to the support device and releasable to move relative to the support device about a second plurality of axes,*

*a first handle coupled to the elongated member and operatively coupled to the clamping device, the support device extending away from the clamping device beyond the leg holder to a distal end, the first handle being situated beyond the distal end of the support member and movable to move the first and second clamping device elements between the respective first and second clamping positions and the respective first and second releasing positions, and the first handle being usable to reposition the elongated member about the first and second axes after the first and second clamping device elements are moved to the respective first and second releasing positions, and*

*a second handle movable to lock the leg holder from moving about the second plurality of axes relative to the support device and movable to unlock the leg holder for movement about the second plurality of axes relative to the support device.*

*50. The leg positioning apparatus of claim 49, wherein the second handle is positioned between the first handle and clamping device.*

*51. The leg positioning apparatus of claim 49, further comprising a resilient device configured to counterbalance weight supported by the leg holder, the resilient device being coupled to the mounting device, and the resilient device being coupled to the support device.*

*52. The leg positioning apparatus of claim 49, wherein the mounting device includes a block adapted to be coupled to an accessory rail of a patient-support table.*

* * * * *